No. 778,041. PATENTED DEC. 20, 1904.
J. A. HORTON.
WIRE MAKING MACHINERY.
APPLICATION FILED OCT. 26, 1903.
NO MODEL. 6 SHEETS—SHEET 1.
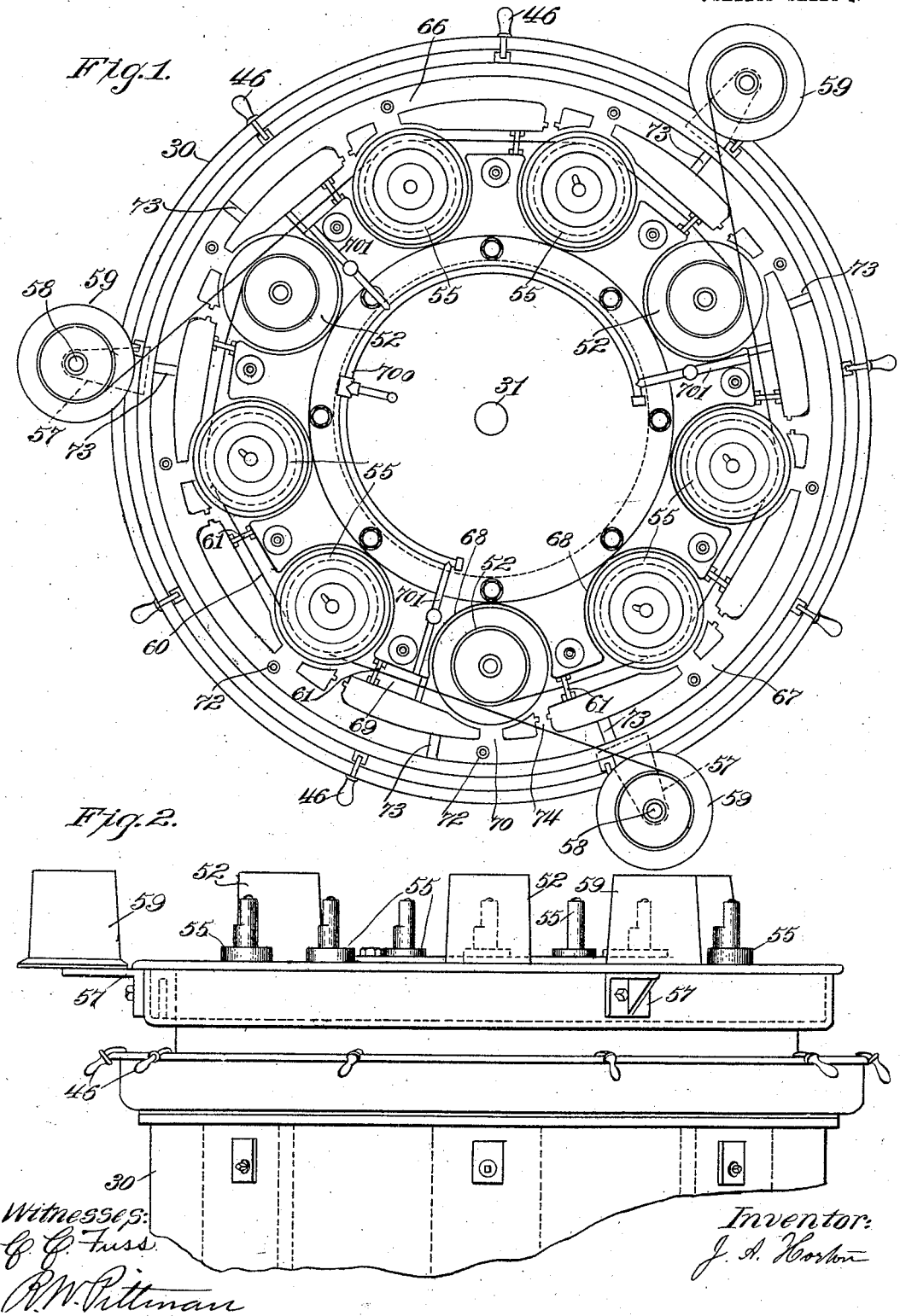
Witnesses:
C. C. Fuss.
R. W. Pittman.
Inventor:
J. A. Horton

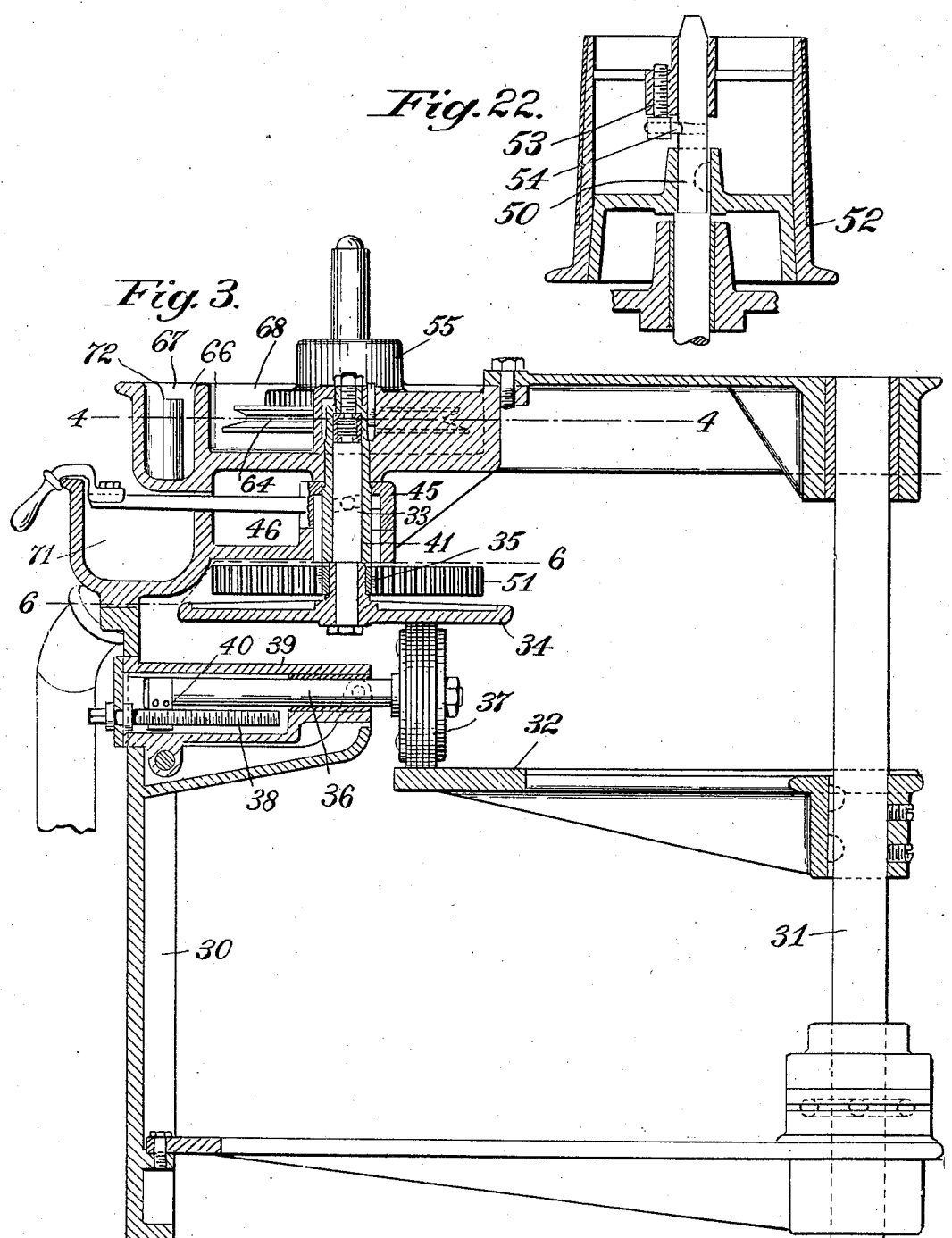

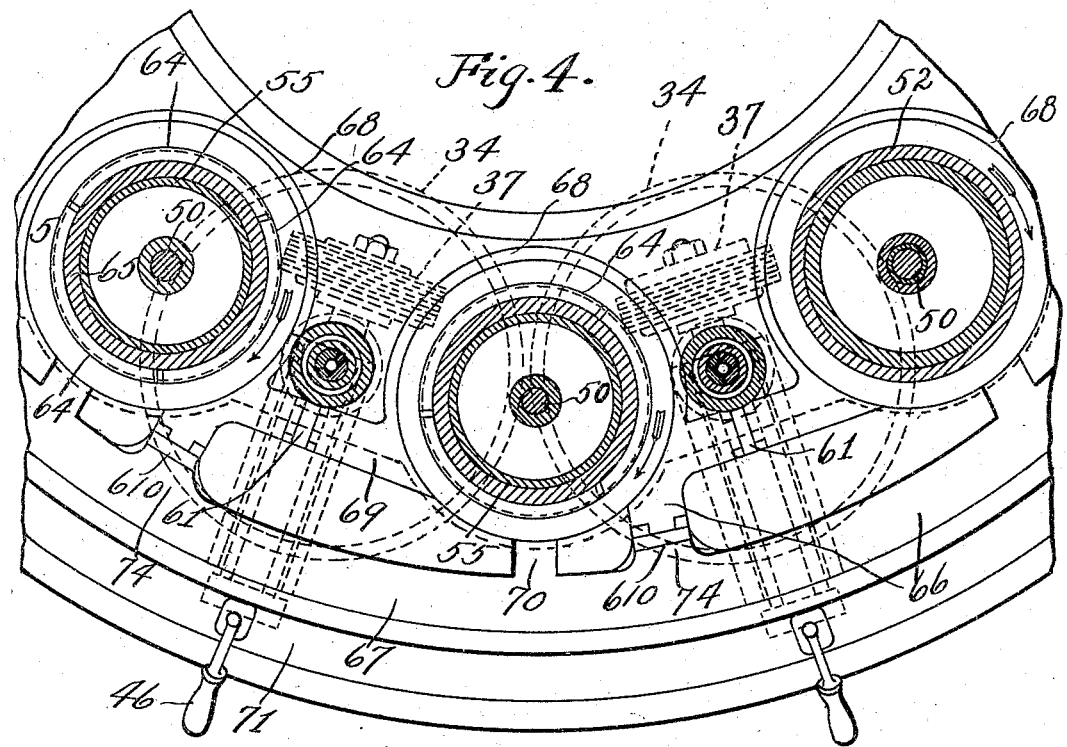
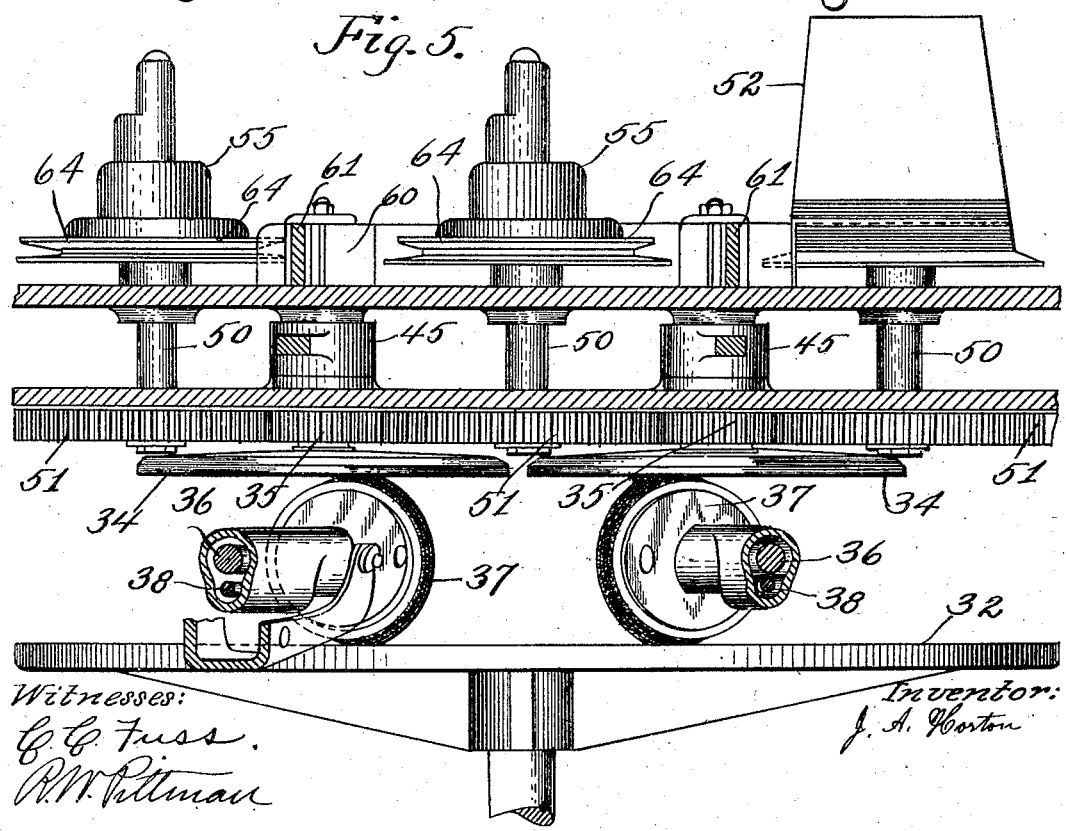

No. 778,041. PATENTED DEC. 20, 1904.
J. A. HORTON.
WIRE MAKING MACHINERY.
APPLICATION FILED OCT. 26, 1903.
NO MODEL. 6 SHEETS—SHEET 4.
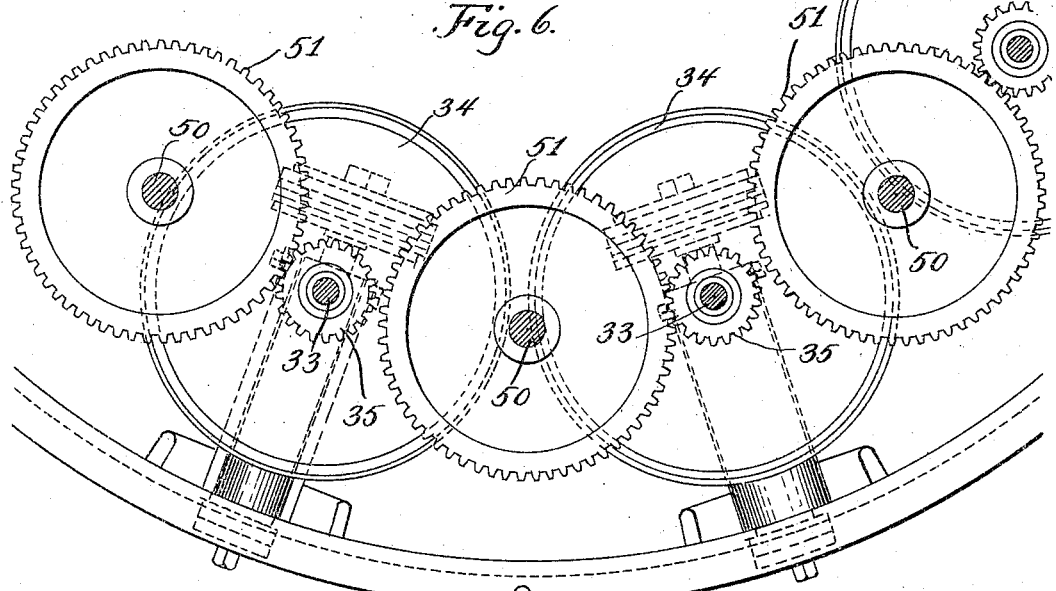
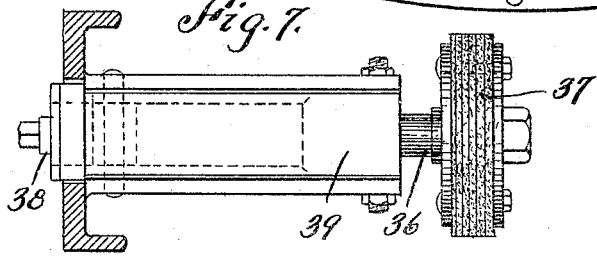
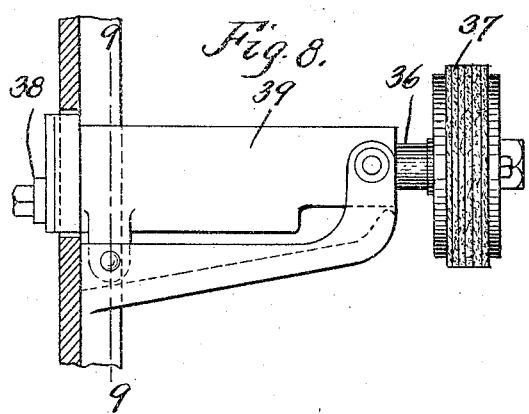
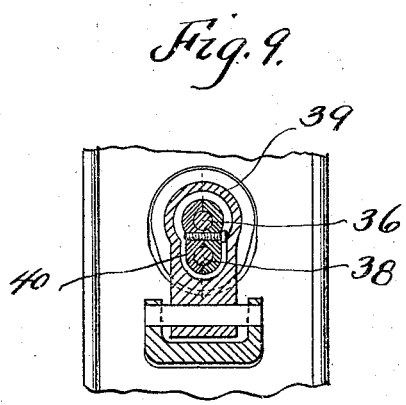
Witnesses:
C. C. Fuss.
R. W. Pittman.
Inventor:
J. A. Horton No. 778,041. PATENTED DEC. 20, 1904.
J. A. HORTON.
WIRE MAKING MACHINERY.
APPLICATION FILED OCT. 26, 1903.
NO MODEL. 6 SHEETS—SHEET 5.
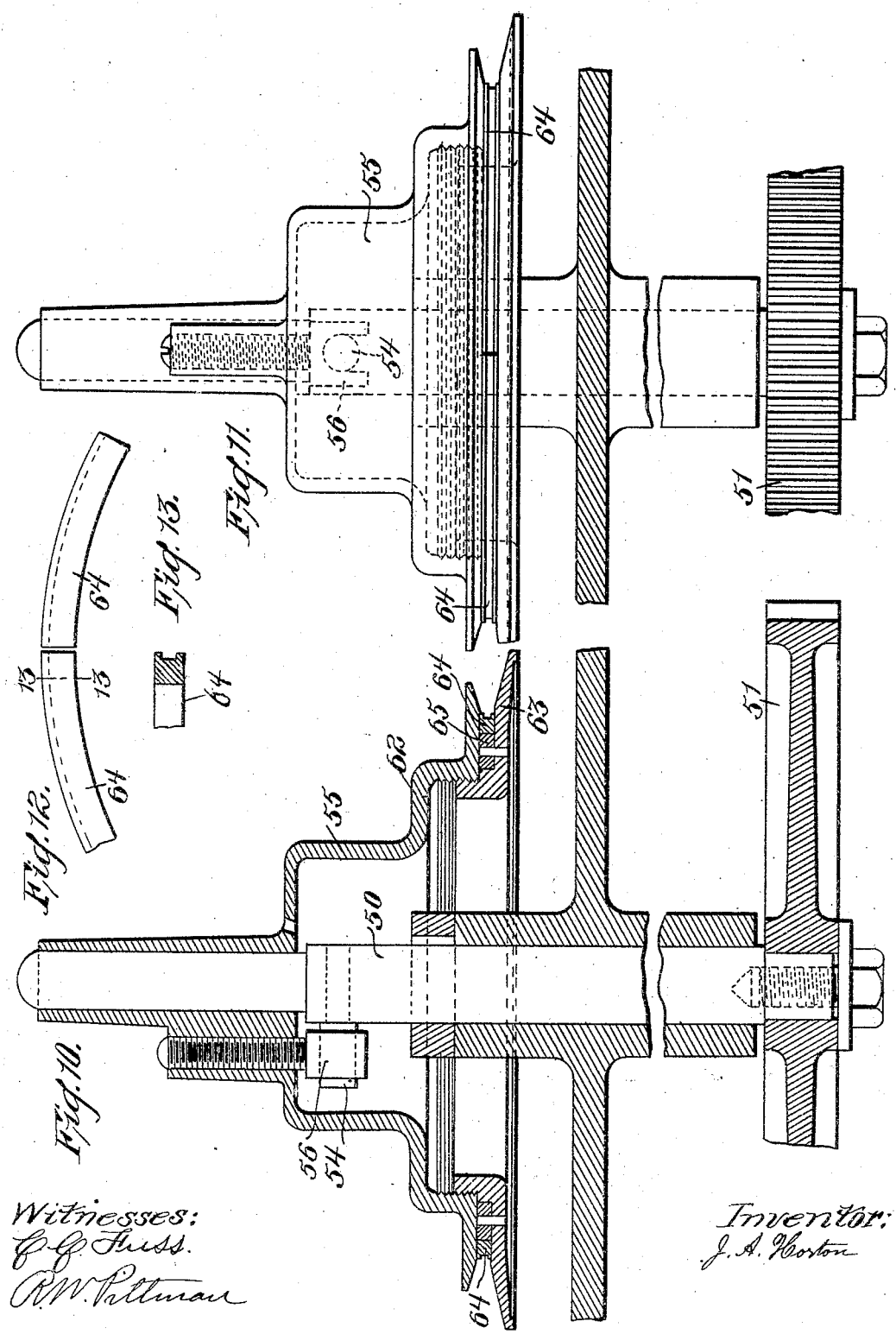
Witnesses:
C. C. Fuss.
R. W. Pittman
Inventor:
J. A. Horton

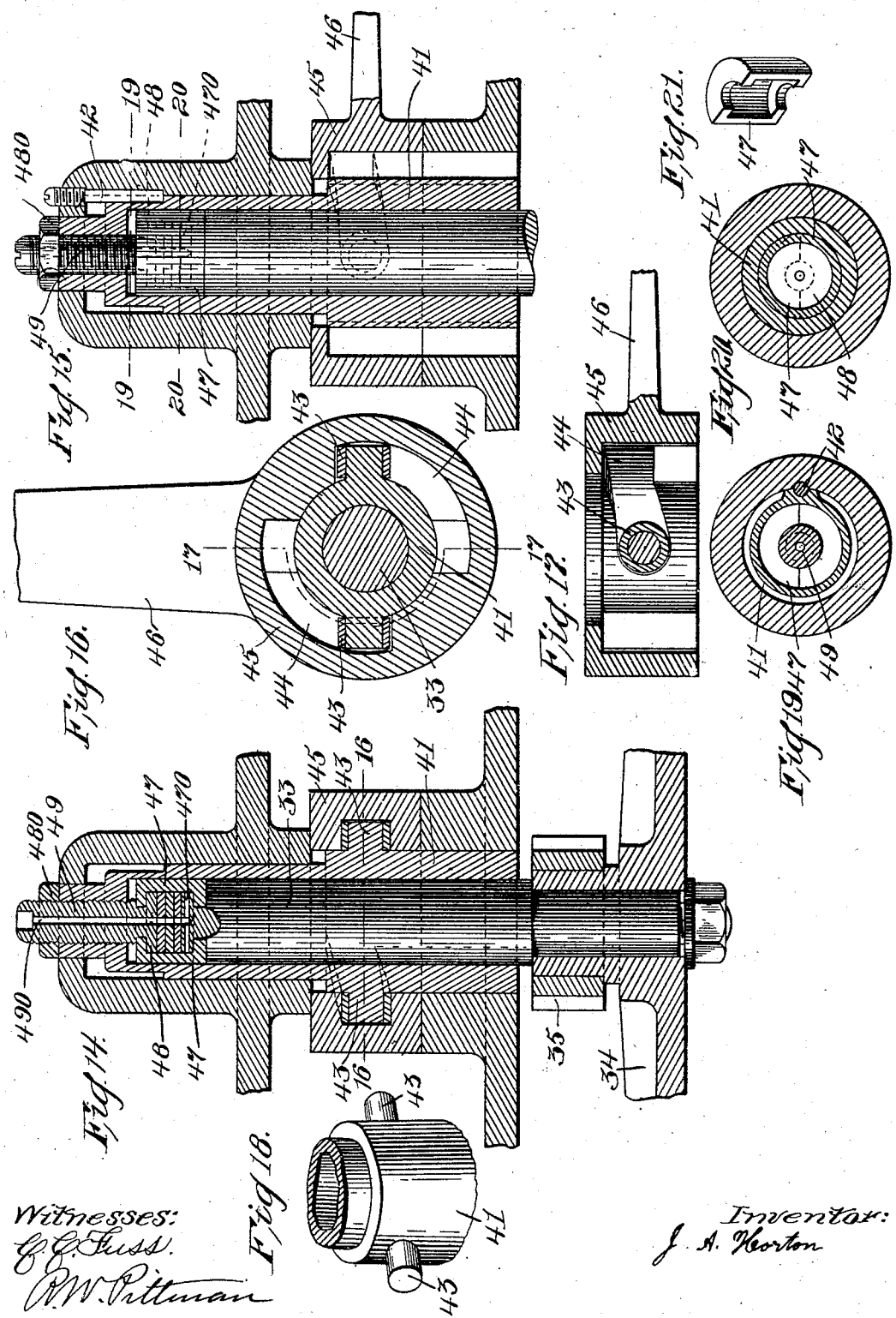

No. 778,041.  
Patented December 20, 1904.

UNITED STATES PATENT OFFICE.

JAMES A. HORTON, OF PROVIDENCE, RHODE ISLAND, ASSIGNOR TO IROQUOIS MACHINE COMPANY, OF NEW YORK, N. Y., A CORPORATION OF NEW YORK.

WIRE-MAKING MACHINERY.

SPECIFICATION forming part of Letters Patent No. 778,041, dated December 20, 1904.

Application filed October 26, 1903. Serial No. 178,489.

*To all whom it may concern:*

Be it known that I, JAMES A. HORTON, a citizen of the United States, residing in Providence, in the county of Providence and State of Rhode Island, have invented certain new and useful Improvements in Wire-Making Machinery, of which the following is a specification.

This invention relates to wire-drawing machinery, and relates more especially to that class of wire-drawing machinery which consists of an organized series or system of wire-drawing components or mechanisms, each comprising draft means combined with a drawing-die, the several components of the system being operatively connected for simultaneous operation for the purpose of reducing wire by a relatively large number of steps or die actions consecutively performed in the course of its passage through the machine, and this converting relatively large wire—more especially steel wire, particularly when of high quality or high in carbon—by an operation that may be properly designated as "continuous" as contradistinguished from the old method of wire manufacture, under which a partial reduction was first made by a small number of successive single wire-drawing operations, a further reduction being afterward made by a corresponding series of wire-drawing operations relatively few in number; the wire being subjected to a separate annealing operation or process between such drawing processes.

In accordance with my present invention I provide the machine or apparatus with a series of wire-forwarding mechanisms or devices, which may properly comprise a driving-drum, adapted for supplemental wire-forwarding devices or otherwise for instantly and constantly varying the drum friction, whereby the wire is forwarded from one drawing-station to another by means of the variation in the wire tension, this being done in such manner as to constantly renew the adjustment as between the driving power and the wire tension, thereby to reduce the variations in the wire tension to a minimum amount less than such a variation as will injuriously affect the wire-drawing process.

For illustrating my present improvements and for carrying out the manufacture of wire, especially steel wire of relatively high quality, by continuous operation or process, whereby the wire may be reduced from a relatively large size to a relatively small size without an intervening annealing operation requiring the wire to be removed from the machine, I have devised the mechanism which is illustrated in the accompanying drawings, in which—

Figure 1 represents a plan view of a wire-drawing machine constructed in accordance with my invention. Fig. 2 represents a side elevation thereof. Fig. 3 represents an axial vertical section. Fig. 4 represents a section on line 4 4 of Fig. 3. Fig. 5 is a side elevation of the mechanism shown in Fig. 4, showing the parts as seen from below in Fig. 4 and with some portions broken away for more clearly showing the several details. Fig. 6 represents a section on line 6 6 of Fig. 3. Fig. 7 represents a plan view of one of the idle friction-wheels. Fig. 8 represents a side elevation thereof. Fig. 9 represents a section on line 9 9 of Fig. 8. Fig. 10 represents a vertical section of one of the traction-drums on an enlarged scale. Fig. 11 represents a side elevation thereof. Fig. 12 represents a plan view of a portion of the angular wire-engaging device on one of the drums. Fig. 13 represents a section on line 13 13 of Fig. 12. Fig. 14 represents a vertical section through the spindle of one of the driven friction-wheels. Fig. 15 represents a section at right angles to Fig. 14. Fig. 16 represents a section on line 16 16 of Fig. 14. Fig. 17 represents a section on line 17 17 of Fig. 16. Fig. 18 represents a detail perspective view of the trunnioned portion of the sleeve surrounding the spindle. Fig. 19 represents a section on line 19 19 of Fig. 15. Fig. 20 represents a section on line 20 20 of Fig. 15. Fig. 21 represents a detail perspective view of a member at the head of the spindle. Fig. 22 represents an axial section of one of the receiving-drums.

The same reference characters indicate the same parts in all the figures.

Some features herein illustrated and described constitute in part the subject-matter of Letters Patent of the United States No.

742,987, granted to me November 3, 1903, for improvements in wire-drawing machinery, to which reference may be had.

In the drawings I have illustrated in detail the construction and organization of a wire-drawing machine or apparatus embodying my present improvements and in which the principal framework of the machine, which is shown of circular arrangement, is designated by 30. The framework is shown provided with a vertical shaft 31, which is to be supported in some suitable manner for operation as a driving-shaft. In the system of wire-drawing apparatus comprised in the machine shown in the accompanying drawings each of the drawing-drums, together with its accompanying die and such coactive devices as are convenient for making the same operative, I designate as a "wire-drawing station." In this system of mechanism in the form illustrated each of the terms comprises a wire-forwarding means or device combined with driving mechanism, the construction and organization being such, substantially as hereinafter more fully set forth, as to provide for the instantaneous and constant regulation or control of the drum friction by the wire tension. This automatic regulation or compensation is measured or determined by the call of the wire beyond the particular drum or by the tension of the wire. The driving mechanism is preferably run at a constant speed slightly in excess of the proper speed. In this way abrasion of the wire is reduced.

In carrying my invention into practice in the way now best known to me I make the connection between the wire-forwarding means and the driving mechanism a friction connection, the pressure in which is automatically and constantly regulated in a continuous manner by the tension of the wire. In the specific construction shown in drawings the wire-forwarding means consists of a number of segments or shoes collectively having a face or surface which engages and forwards the wire. These shoes are mounted on a revolving hub actuated by suitable gearing, which hub and its gearing constitute the driving mechanism for the wire-forwarding means. The wire is wrapped or given one or more turns around the wire-forwarding means, whereby the frictional engagement or connection between the wire-forwarding means and the driving mechanism is automatically regulated by the tension of the wire. On said shaft is keyed a driving friction-wheel 32, and around said shaft in an annular series are arranged vertical shafts or spindles 33, to the lower ends of which are keyed driven friction-wheels 34 and above these wheels toothed pinions 35. Between the wheels 32 34 on horizontal spindles 36 are mounted intermediate friction wheels or roller 37 with tractive surfaces composed of leather or other suitable material. By means of screws 38, fixed against axial movement in bearings 39 on the frame and engaging nuts 40 on the outer ends of the spindles 36, the rollers 37 may be moved between the wheels 32 34 toward or away from the central shaft 31. Such movement of a roller 37 varies its radial position on the respective wheels 32 34 inversely, so that the speed at which the wheel 34 is driven from the wheel 32 through the roller 37 may be varied as desired, the speed of any wheel 34 being variable independently of that of the other wheels 34. In order that any wheel 34 may be arrested by lifting it from its roller 37, I surround each shaft 33 with a sleeve 41, held from rotation by a pin 42. The sleeve has studs or trunnions 43 43, projecting into inclined slots 44 44 on a cam 45, adapted to be oscillated by a handle 46. Such oscillation produces a vertical movement of the sleeve 41, which is transmitted to the shaft 33 by means of a nut 480, abutting the upper end of the sleeve and mounted on a screw-stud 49, said stud having a head 48 at its lower end connected with a head 470 on the shaft 33 by a pair of flanged half-collars 47 47. By means of the nut 480 the axial relation of the sleeve 41 and shaft 33 may be adjusted.

490 is an oil-duct traversing the bearing formed by the above-mentioned parts.

Alongside of the several shafts or spindles 33 are other vertical spindles or holders 50 50, having gears 51 51, keyed to their lower ends and meshing with the pinions 35. I have shown the machine equipped with nine spindles 35 and nine spindles 50, divided up among three drawing units. On every third spindle 50 there is a wire receiving or storing drum 52, having a forked coupling member 53, engaged with a complemental coupling member formed as a stud 54, projecting from the spindle 50, whereby the drum is removably supported on said spindle and caused to rotate therewith. On the other two spindles 50 of each drawing unit are mounted traction-drums 55, having forked members 56, engaged with the studs 54, whereby said drums are removably attached to and caused to rotate with the spindles. On the outer rim of the frame 30 are mounted brackets 57, carrying spindles or holders 58, on which are mounted loosely-rotating delivering-reels 59, one for each drawing unit, from which the wire unwinds. From the delivery-reel 59 of each unit the wire 60 passes through a drawing-die 61, fixed vertically in the frame 30, then takes one or more turns around one of the traction-drums 55, then passes through a second die 61, then takes one or more turns around the next succeeding traction-drum 55, then passes through a third die 61, and is finally coiled up on the receiving-drum 52. The apertures of the dies are graded in diameter, each succeeding die being smaller than the next preceding one, so that the diameter of the wire is reduced by stages in passing through the drawing unit and its length increased at each stage. To meet this increase in length, the second one of the traction-drums 55 in the series is speeded faster than the first and the receiving-drum 52 is speeded faster than the second traction-drum, the object being to have the peripheral speed of the drum correspond approximately, but to be slightly in excess of the linear speed of the wire.

The traction-drums 55 are shown made up of separable upper and lower portions 62 63, screwed together and loosely confining between them a series of ring segments or sections 64 64, forming an annular wire-engaging portion or split ring. These ring-segments on each drum are carried around by their frictional engagement with the annular seat 65 on the drum against which they reside, and the amount of this friction obviously depends upon the inward radial pressure exerted by the coils of wire engaging the ring-segments 64. This pressure in turn depends upon the tension of that portion of the wire which leads off from the drum into the next succeeding die. If the linear speed of this portion of the wire is less than that of the periphery of the drum at a diameter equal to that of the wire-engaging surface of the ring-sections, the coil will loosen and diminish the frictional contact of the ring-sections with their seat 65. This loosening of the wire will also diminish its own friction against the ring-sections; but the ring-sections will, nevertheless, follow the wire and any slip which occurs will take place between the ring-sections and the drum rather than between the ring-sections and the wire, thus avoiding abrasion of the wire. During such slippage the drum does not lose its propelling effect on the wire, for it will propel the wire in proportion to the friction between the ring-sections and the drum. It will be observed that the friction-ring formed by the segments 64 64 constitutes a wire-forwarding means or annular supplemental friction-driver having an automatically regulating or compensating frictional connection with its driving mechanism or drum 55, regulated by the "call" or demand of the wire for being drawn, or, in other words, regulated according to the tension of the wire.

The several drums 52 and 55 are mounted in a liquor trough or receptacle 66 of annular form and continuous around the frame 30, designed to contain a lubricating liquor, in which I immerse the wire-engaging portions of the drums 55, the holes or eyes in the dies, and the wire as it passes between the said drums and dies. Such immersion of the wire in its transit to the dies lubricates the shoes, the wire, and the dies, and carries off the heat created by the friction between the wire and dies. This trough has a continuous outer channel 67 encircling the frame and small circular inner portions 68 containing the drums 52 and 55 and connected by straight channels 69, in which the dies 61 are located. The trough portions 68 connect by short channels 70 with the channel 67. A supply of lubricating liquor is maintained through a pipe 700, having branches 701 in the portions of the trough 66 occupied by the several drawing units and overflows into a lower trough 71 through removable overflow-pipes 72, placed in drainage-apertures in the floor of the channel 67 at a lower level than the floors of the rough portions 68, so that any sediment in the liquor may collect at the bottom of the channel 67, where the liquor is comparatively undisturbed by the rotation of the drawing-drums. This channel 67 may be flushed from time to time by temporarily removing the overflow-tubes 72. In order to allow the wire to run dry onto the receiving-drums 52, it is necessary to dam off those portions of the trough 66 containing said receiving-drums, which may be done by means of removable dams 73 73, located in the channels 67 and 69, the dies 61 also acting as dams in the channels 69. The portions of the trough thus shut off are kept drained by the removal of their overflow-tubes 72.

When the machine is constructed as above described, I am enabled to subject a batch of wire to a relatively large number of passes on the one machine without rearranging the dies. The average speed of a series, for instance, of nine drums would be much lower than that of three series of three drums each. I accordingly take the wire from the receiving spindle or holder of the unit through which it has been drawn and place it in the next unit of the same or a similar machine, this being accomplished by removing the receiving-drum 52 bodily from its spindle or holder 50 and placing said drum on the delivery spindle or holder 58 of the next unit. The several receiving-drums and delivery-reels of the different units are made interchangeable on the spindles of the other units, so that any delivery-reel can be substituted for any receiving-drum, and vice versa, whereby I avoid direct handling of the wire, which has a tendency to cause it to snarl. It is apparent also that by reason of the interchangeability of the receiving-drums 52 and traction-drum 55 on each other's spindles or holders the number of drawing-drums to a unit may be varied. Thus if all of the spindles but one were to carry traction-drums 55 and that one a receiving-drum with the die properly arranged the whole machine would be a single drawing unit of nine drums. Conversely, with receiving-drums on each spindle the machine would contain nine single-pass units, the radial dies 610 being permissibly used in this case.

With this machine I am enabled to realize a much greater maximum linear speed of the wire than has heretofore been found practicable, thereby increasing production, and I also improve the quality of the wire and increase the life of the dies.

The line contact of the wire coils gives a better gripping action between the shoes and the wire than surface contact gives between the shoes and the drum; but neglecting this and also neglecting any effect which centrifugal force may have in causing the shoes to cling to the wire it is evident that with equal friction between the wire and the shoes and between the shoes and the drum the first friction—namely, the outer one—will be a force acting on a longer arm from the center of rotation than the arm on which the inner friction acts. The outer friction therefore prevails over the inner friction, and the shoes must follow the wire and slip against the drum when the wire and the drum have different speeds. During such slippage the drum does not lose its propelling effect on the wire, for it will propel the wire in proportion to the friction between the shoes and the drum. It will be observed that the segments or shoes 64 64 collectively constitute a wire-forwarding means or section supplemental friction-driver adapted to slip circumferentially on said driving mechanism and having an automatically regulating or compensating frictional connection with its driving mechanism of drum 55, regulated by the call or demand of the wire for being drawn, or, in other words, regulated according to the tension of the wire.

The organization of the complete wire-drawing mechanism is such that the constantly-renewing adjustment between the wire and its forwarding means at one drum or station extends back for coacting with the wire tension at the preceding station to control the drum friction at such preceding drum or station, and such coaction of a plurality of drums similarly extends back to assist in controlling the wire tension for regulating the drum friction of a wire-forwarding means next beyond such plurality of drums. By means of this organization of the complete wire-drawing mechanism there is an instantaneous renewing of the adjustment between the wire and its forwarding means, and this action is also made constantly acting during the operation of the mechanism, and thereby such transmission of the variable action which occurs at any one drum or station is prevented from extending back far enough or with sufficient force to materially interfere with a correspondingly constant and instantaneous control by the wire tension of the drum friction at a preceding drum or station in the series comprised in the organized mechanism. By reason of the organization and features here set forth the instantaneous and continuous manner in which the wire-forwarding means is operable by the varying tension of the wire coil or coils carried by such wire-forwarding means, taking account also of the elasticity of the wire itself in the space between three or more successive stations, the complete and proper renewing adjustment as regards one intermediate station of such a series of stations is effected and constantly maintained by an amount of mechanical action (as between the running wire and a given intermediate station) which does not exceed the amount of elasticity of the portion of wire which extends from the preceding station to, around, and beyond said given station and forwardly to the next succeeding station, and by this means each of the intermediate stations is made completely coactive with the adjacent station forwardly and backwardly thereof in the series of stations.

Having thus described my invention, I claim—

1. The combination in a multidrum wire-drawing machine organized for continuous operation, of means for driving the several drums of the series at successively-increasing speeds respectively, a series of dies of successively-reduced sizes one for each of said drawing-drums respectively, and a series of wire-forwarding devices mounted one upon each of said drawing-drums, a plurality of said forwarding devices each consisting of a ring or band adapted for receiving the wire in one or more turns thereon and adapted for smoothly sliding on its drawing-drum, and said ring or band consisting of relatively independently acting portions so organized in connection with the drums and coactive devices of the machine as to effect an instantaneously and constantly renewing adjustment as between the wire tension and the drum friction at the point where the wire leaves the drum.

2. The combination in a wire-drawing machine organized for continuous operation and having a series of draft-drums for forwarding the wire, of means for simultaneously driving the several drums of the series, a series of dies of successively-reduced sizes one for each of said drawing-drums respectively, and a series of regulable wire-forwarding devices one mounted upon each of a plurality of said drums and arranged for coacting through the wire upon each other and each consisting of a ring or band having relatively independently acting portions adapted for receiving the wire in one or more turns thereon and adapted for regulable action relatively to the drawing-drum and so organized in connection with the drums and coactive devices of the machine as to effect a constantly-renewing adjustment as between the wire tension and the drum friction at the point where the wire leaves the wire-forwarding ring or band.

3. The combination in a multidrum wire-drawing machine organized for continuous operation, of means for simultaneously driving the several drums of the series, a series of dies of successively-reduced sizes one for each of said drawing-drums respectively, and a series of wire-forwarding devices mounted one upon each of said drawing-drums, a plurality of said forwarding devices each consisting of relatively independently acting portions so organized in connection with the drums and coactive devices of the machine as to effect a constantly-renewing adjustment as between the wire tension and the drum friction at the point where the wire leaves the drum.

In testimony whereof I have affixed my signature in presence of two witnesses.

JAMES A. HORTON.

Witnesses:
FRED. J. DOLE,
R. M. PIERSON.